United States Patent
Kang et al.

(10) Patent No.: US 9,854,217 B2
(45) Date of Patent: Dec. 26, 2017

(54) MOBILE TERMINAL EQUIPPED WITH A CAMERA AND CONTROLLING METHOD THEREOF

(71) Applicant: LG ELECTRONICS INC., Seoul (KR)

(72) Inventors: Kyunghee Kang, Seoul (KR); Jinsool Lee, Seoul (KR); Seonyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 14/938,639

(22) Filed: Nov. 11, 2015

(65) Prior Publication Data

US 2017/0034494 A1    Feb. 2, 2017

(30) Foreign Application Priority Data

Jul. 29, 2015   (KR) .................. 10-2015-0107540

(51) Int. Cl.
*H04N 9/73* (2006.01)
*H04N 5/235* (2006.01)
(Continued)

(52) U.S. Cl.
CPC .......... *H04N 9/735* (2013.01); *H04N 5/2357* (2013.01); *H04N 5/23229* (2013.01); *H04N 5/33* (2013.01)

(58) Field of Classification Search
None
See application file for complete search history.

(56) References Cited

U.S. PATENT DOCUMENTS

| 5,099,313 A | 3/1992 | Suemoto et al. |
| 2003/0058350 A1 | 3/2003 | Ishimaru et al. |

(Continued)

FOREIGN PATENT DOCUMENTS

| JP | 7-75113 | 3/1995 |
| JP | 07075113 A * | 3/1995 |

(Continued)

OTHER PUBLICATIONS

European Patent Office Application Serial No. 150032803, Search Report dated Feb. 16, 2016, 9 pages.

(Continued)

*Primary Examiner* — Roberto Velez
*Assistant Examiner* — Quan Pham
(74) *Attorney, Agent, or Firm* — Lee, Hong, Degerman, Kang & Waimey (57) ABSTRACT

A mobile terminal configured to process images, the mobile terminal comprising: a camera configured to capture images; an image sensor configured to acquire an image signal of an object in an image captured via the camera; an infrared sensor configured to detect an infrared signal reflected from the object; a controller configured to utilize the image sensor to: determine whether flicker is generated; and detect information related to a light source contributing to the generated flicker based on the detected infrared signal; and an image processor configured to perform white balance of the acquired image, the white balance performed based on the detected information if flicker is generated, and provides an effective white balancing method according to types of peripheral light sources through flicker analysis based on the image sensor and the infrared sensor.

18 Claims, 7 Drawing Sheets

(51) Int. Cl.
*H04N 5/232* (2006.01)
*H04N 5/33* (2006.01)

(56) References Cited

U.S. PATENT DOCUMENTS

| | | | |
|---|---|---|---|
| 2003/0142239 A1* | 7/2003 | Yoshida | H04N 5/235 348/607 |
| 2005/0174442 A1 | 8/2005 | Yuyama | |
| 2012/0200736 A1* | 8/2012 | Toyoda | H04N 5/2357 348/226.1 |
| 2014/0179289 A1* | 6/2014 | Moon | H04W 4/12 455/415 |

FOREIGN PATENT DOCUMENTS

| | | |
|---|---|---|
| JP | 2011-087136 | 4/2011 |
| KR | 10-2007-0112949 | 11/2007 |
| KR | 10-0968377 | 7/2010 |
| KR | 10-2011-0125146 | 11/2011 |
| KR | 10-1254216 | 4/2013 |

OTHER PUBLICATIONS

PCT International Application No. PCT/KR2015/009798, International Search Report dated May 24, 2016, 10 pages.
European Patent Office Application Serial No. 15003280.3, Oral Proceedings dated Sep. 6, 2017, 6 pages.

* cited by examiner

MOBILE TERMINAL EQUIPPED WITH A CAMERA AND CONTROLLING METHOD THEREOF

CROSS-REFERENCE TO RELATED APPLICATION

Pursuant to 35 U.S.C. §119(a), this application claims the benefit of earlier filing date and right of priority to Korean Application No. 10-2015-0107540, filed on Jul. 29, 2015, the contents of which are hereby incorporated by reference herein in its entirety.

1. Field of the Invention

The present invention relates to a mobile terminal equipped with a camera that processes images by performing white balance, and a controlling method thereof.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

The mobile terminal, which is equipped with a camera that processes images by performing white balance, includes an antenna to perform wireless communication with an external device, a base station or a server. Recently, electronic devices such as a camera are integrated into a mobile terminal. For convenience, white balance may be performed automatically. Particularly, since the white balance has different kinds of color temperatures depending on types of light sources, it is required to exactly identify the type of light sources to achieve white balance.

In this respect, since indoor lamps such as an incandescent lamp and a fluorescent lamp are operated at the same frequency or 50 Hz or 60 Hz, problems occur in that it is not easy to identify indoor lamps and achieve white balance considering the indoor lamps.

SUMMARY OF THE INVENTION

Therefore, an object of the present invention is to solve the aforementioned problems. Another object of the present invention is to provide a mobile terminal equipped with a camera that performs white balance by considering peripheral light sources and a controlling method thereof.

To achieve these and other advantages and in accordance with the purpose of this specification, as embodied and broadly described herein, according to one aspect of the present invention, a mobile terminal configured to process images, the mobile terminal comprising a camera configured to capture images; an image sensor configured to acquire an image signal of an object in an image captured via the camera; an infrared sensor configured to detect an infrared signal reflected from the object; a controller configured to utilize the image sensor to: determine whether flicker is generated; and detect information related to a light source contributing to the generated flicker based on the detected infrared signal; and an image processor configured to perform white balance of the acquired image, the white balance performed based on the detected information if flicker is generated.

According to one embodiment, the light source includes a first light source that is incandescent light and a second light source that is fluorescent light; and the white balance is performed based on the second light source if the detected infrared signal is less than or equal to a predetermined value.

According to one embodiment, the light source further includes a third light source that is solar light; and the white balance is performed based on the third light source if the detected infrared signal is greater than the predetermined value and flicker is not generated.

According to one embodiment, the image signal and the infrared signals each includes a plurality of input signals each having a different starting point; and a frequency of an exposure time of each of the plurality of input signals is different from operation frequencies of the first and second light sources.

According to one embodiment, the white balance is performed based on the first light source if the detected infrared signal is greater than the predetermined value and flicker is generated.

According to one embodiment, the controller is further configured to determine whether flicker is generated based on variation of average intensity of the acquired image signal.

According to one embodiment, the controller is further configured to: determine whether the infrared sensor is enabled; and determine whether flicker is generated if the infrared sensor is not enabled.

According to one embodiment, the white balance is performed based on the third light source if the infrared sensor is not enabled and flicker is not generated; and the controller is further configured to re-determine whether the infrared sensor is enabled if flicker is generated.

According to one embodiment, the controller is further configured to determine whether flicker is generated based on variation of average intensity of the acquired image signal.

According to one embodiment, the image processor is further configured to: perform auto exposure and auto focus of the acquired image; and digitalize and analyze the acquired image processed by white balance, auto exposure and auto focus.

In another aspect of the present invention, an image processing method of a mobile terminal including a camera, the method comprising: acquiring an image signal of an object in an image captured via the camera; detecting an infrared signal reflected from the object; determining whether flicker is generated; detecting information related to a light source contributing to the generated flicker; and performing white balance of the acquired image, the white balance performed based on the detected information if flicker is generated.

According to one embodiment, the light source includes a first light source that is incandescent light and a second light source that is fluorescent light and the white balance is performed based on the second light source if the detected infrared signal is less than or equal to a predetermined value.

According to one embodiment, the light source further includes a third light source that is solar light; and the white balance is performed based on the third light source if the detected infrared signal is greater than the predetermined value and flicker is not generated.

According to one embodiment, the image signal and the infrared signals each includes a plurality of input signals each having a different starting point; and a frequency of an exposure time of the plurality of input signals is different from operation frequencies of the first and second light sources frequencies of the first and second light sources.

According to one embodiment, the white balance is performed based on the first light source if the detected infrared signal is greater than the predetermined value and flicker is generated.

According to one embodiment, determining whether flicker is generated comprises determining a variation of average intensity of the acquired image signal.

According to one embodiment, further comprising: determining whether the infrared sensor is enabled; and determining whether flicker is generated based on variation of average intensity of the acquired image signal if the infrared sensor is not enabled.

According to one embodiment, further comprising: performing white balance based on the third light source if the infrared sensor is not enabled and flicker is not generated; and re-determining whether the infrared sensor is enabled if flicker is generated.

According to one embodiment, determining whether flicker is generated comprises determining a variation of average intensity of the acquired image signal.

According to one embodiment, further comprising: performing auto exposure and auto focus of the acquired image; and digitalizing and analyzing the acquired image processed by white balance, auto exposure and auto focus.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
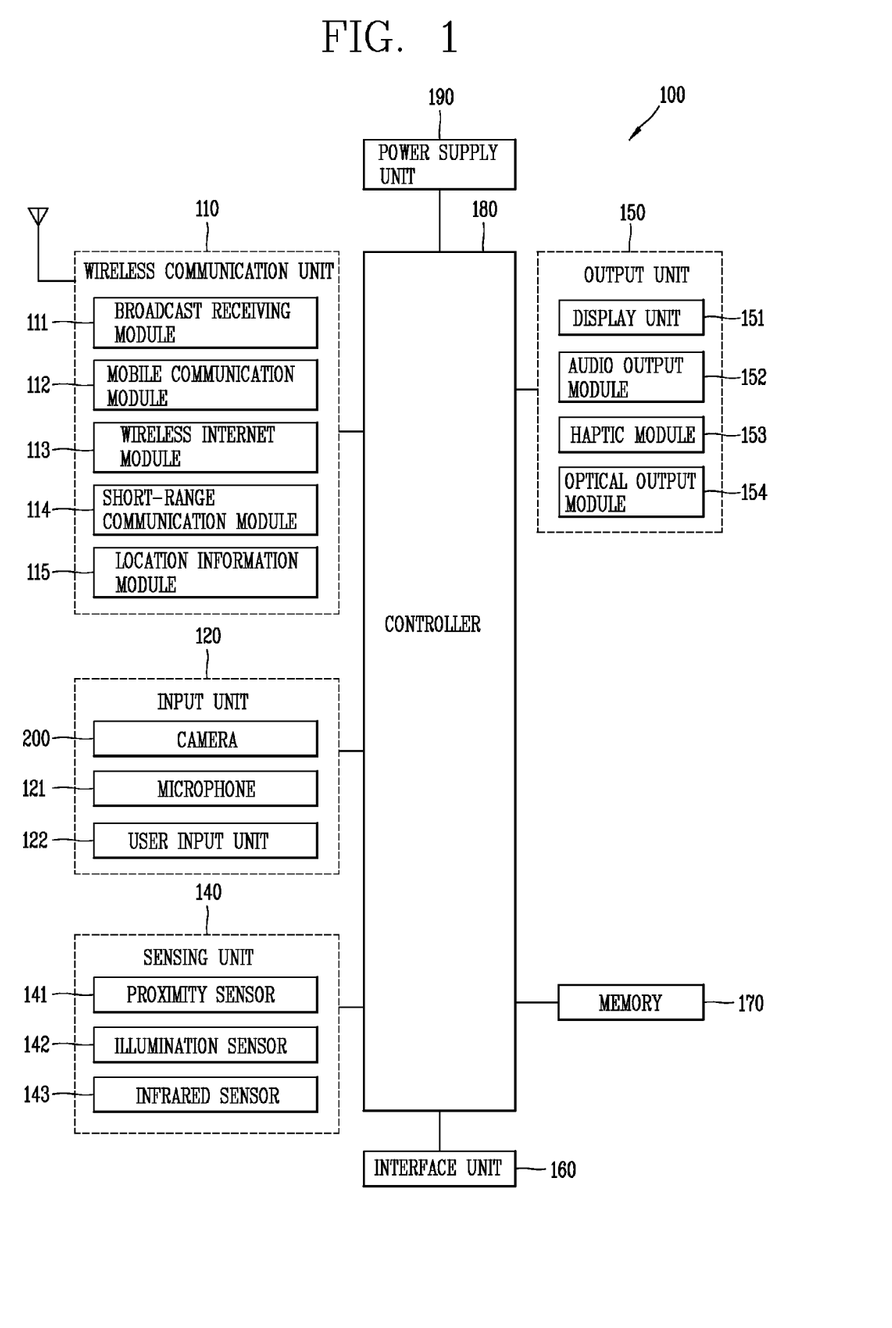
FIG. 1 is a block diagram illustrating a mobile terminal according to the present invention.
Figure 2:
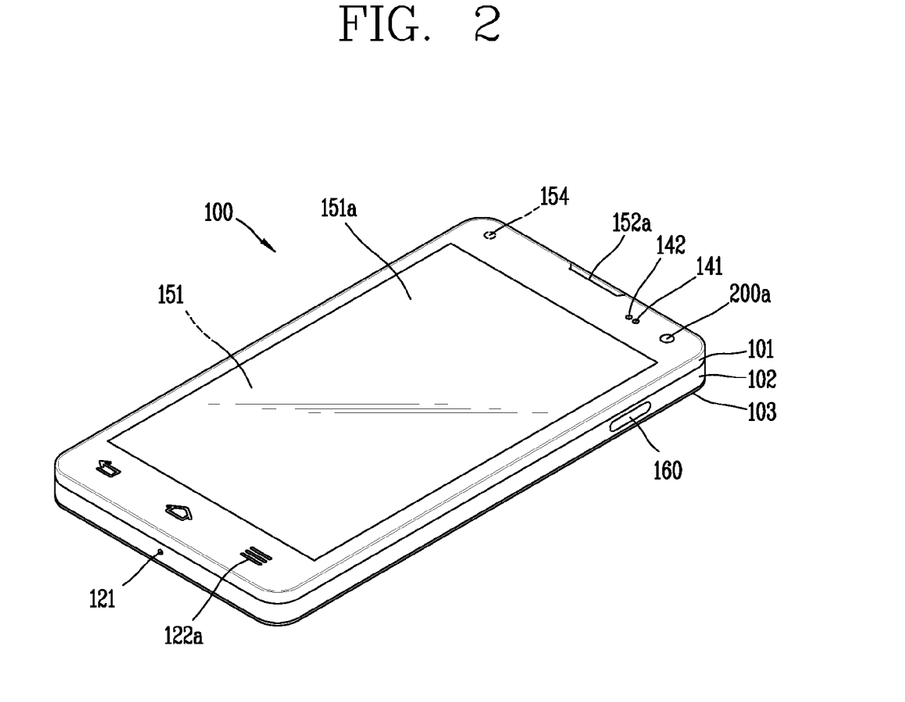
FIGS. 2 and 3 are conceptual views illustrating an example of a mobile terminal according to the present invention, which is viewed from different directions.
Figure 3:
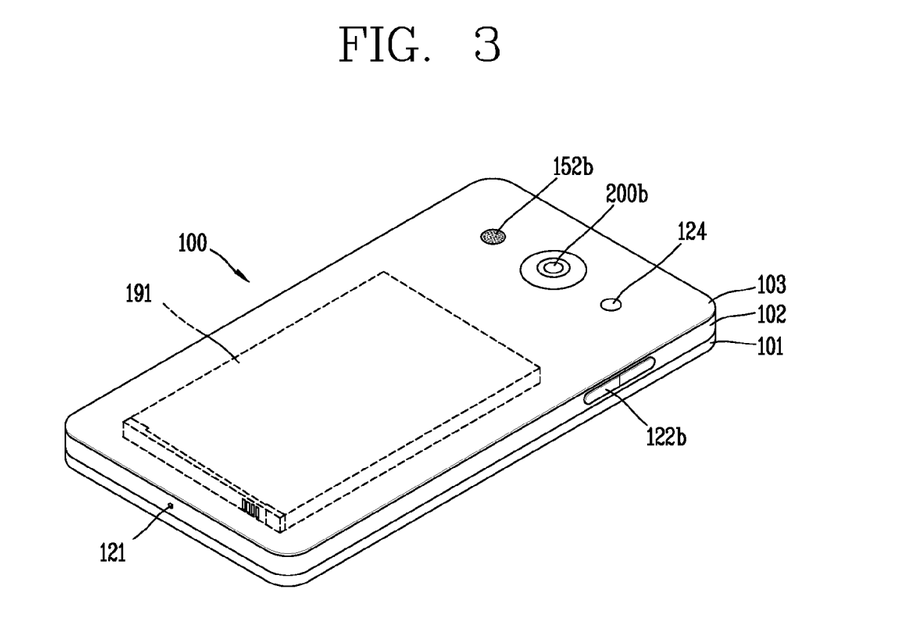

Reference is now made to FIGS. 1 to 3, where FIG. 1 is a block diagram of a mobile terminal in accordance with the present disclosure, and FIGS. 2 and 3 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 200 for obtaining images or video, a microphone 121, which is one type of audio input device for inputting an audio signal, and a user input unit 122 (for example, a touch key, a push key, a mechanical key, a soft key, and the like) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, an infrared (IR) sensor 143, a touch sensor, an acceleration sensor, a magnetic sensor, a G-sensor, a gyroscope sensor, a motion sensor, an RGB sensor, a finger scan sensor, a ultrasonic sensor, an optical sensor (for example, refer to the camera 200), a microphone 121, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 122 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

Furthermore, the memory 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Referring to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 200b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2 and 3 depict certain components as arranged on the mobile terminal. However, it is to be understood that alternative arrangements are possible and within the teachings of the instant disclosure. Some components may be omitted or rearranged. For example, the first manipulation unit 122a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 122 (see FIG. 1). Therefore, the touch screen may replace at least some of the functions of the first manipulation unit 122a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 200a can process image frames such as still or moving images obtained by the image sensor in a capture mode or a video call mode. The processed image frames can then be displayed on the display unit 151 or stored in the memory 170.

The first and second manipulation units 122a and 122b are examples of the user input unit 122, which may be manipulated by a user to provide input to the mobile terminal 100. The first and second manipulation units 122a and 122b may also be commonly referred to as a manipulating portion, and may employ any tactile method that allows the user to perform manipulation such as touch, push, scroll, or the like. The first and second manipulation units 122a and 122b may also employ any non-tactile method that allows the user to perform manipulation such as proximity touch, hovering, or the like.

FIG. 2 illustrates the first manipulation unit 122a as a touch key, but possible alternatives include a mechanical key, a push key, a touch key, and combinations thereof.

Input received at the first and second manipulation units 122a and 122b may be used in various ways. For example, the first manipulation unit 122a may be used by the user to provide an input to a menu, home key, cancel, search, or the like, and the second manipulation unit 122b may be used by the user to provide an input to control a volume level being output from the first or second audio output modules 152a or 152b, to switch to a touch recognition mode of the display unit 151, or the like.

As another example of the user input unit 122, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 122a in the rear input unit. As such, in situations where the first manipulation unit 122a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 122.

The microphone 121 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth™ port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 200b may be further mounted to the rear surface of the terminal body. The second camera 200b may have an image capturing direction, which is substantially opposite to the direction of the first camera unit 200a.

The second camera 200b may include a plurality of lenses arranged along at least one line. The plurality of lenses may also be arranged in a matrix configuration. The cameras may be referred to as an 'array camera.' When the second camera 200b is implemented as the array camera, images may be captured in various manners using the plurality of lenses and images with better qualities may be obtained.

As shown, a flash 124 is shown adjacent to the second camera 200b. When an image of a subject is captured with the camera 200b, the flash 124 may illuminate the subject.

As shown, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

As previously described with regard to FIG. 1, the mobile terminal may be configured to include short-range communication techniques such as Bluetooth™, Radio Frequency Identification (RFID), Infrared Data Association (IrDA), Ultra Wideband (UWB), ZigBee™, Near Field Communication (NFC), Wireless USB (Wireless Universal Serial Bus), and the like.

In the mobile terminal that includes a camera 200 and a display unit 151 in accordance with the present invention, flicker is generated in an image taken in the camera 200. In this case, a problem occurs in that flicker may be removed from the image displayed on the display unit 151 but different white balances cannot be performed depending on types of light sources.

The present invention suggests a mechanism for performing white balance on the basis of types of light sources using an image sensor of a camera and an infrared sensor in an environment that at least one light source exists.

Hereinafter, the mobile terminal of the present invention, which is provided with a camera, an infrared sensor and a display unit, will be described in detail with reference to FIGS. 4 to 9.

Figure 4:
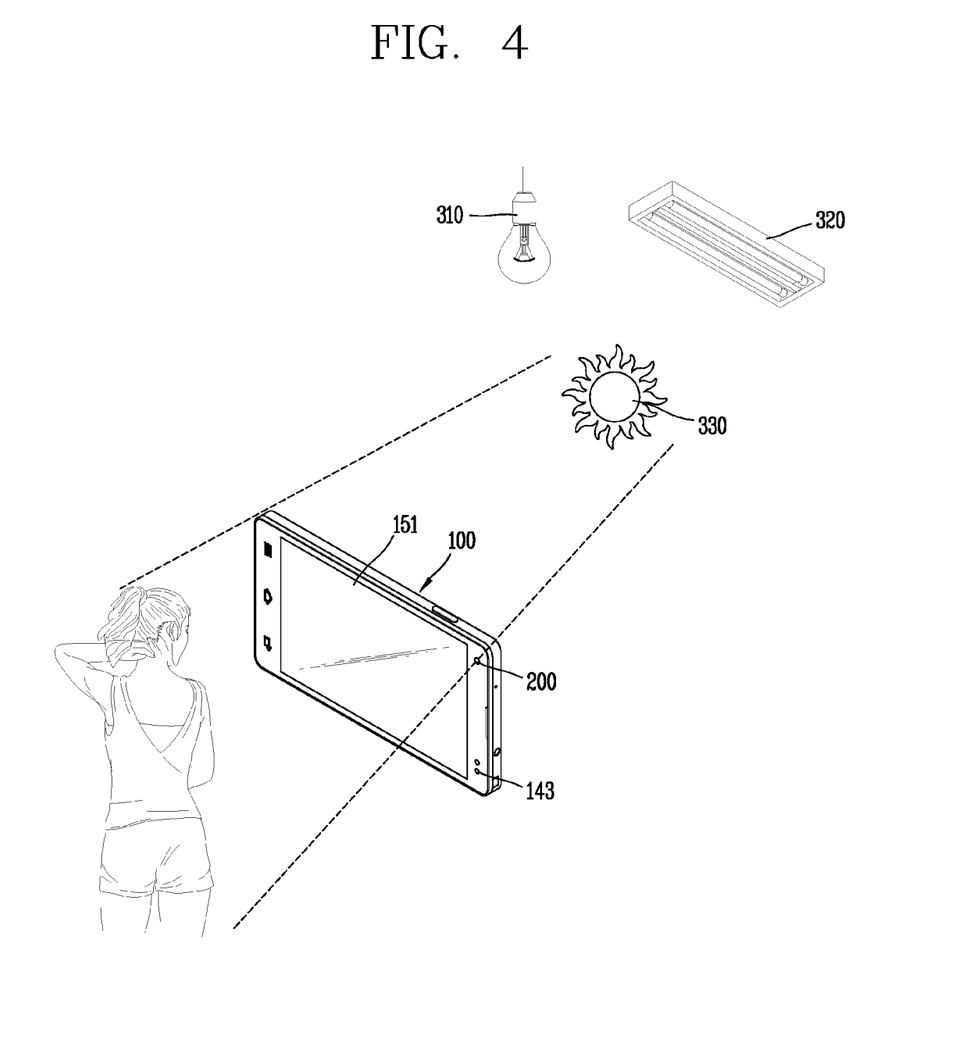
FIG. 4 is a conceptual view illustrating that a mobile terminal determines whether flicker is generated using a camera and an infrared sensor and detects information related to a light source contributing to generation of flicker.

First of all, FIG. 4 is a conceptual view illustrating that a mobile terminal determines whether flicker is generated using a camera and an infrared sensor and detects information related to a light source contributed to generation of flicker.

Referring to FIG. 4, the mobile terminal 100 includes a camera 200, an infrared sensor 143, and a display unit 151.

An image signal of an object taken through the camera 200 is acquired by an image sensor, and the taken image is displayed on the display unit 151.

The present invention embodies a method for white balance, which corrects a color change depending on types of a plurality of light sources that include an incandescent lamp 310, a fluorescent lamp 320, and natural light (solar light) 330, which respectively correspond to first to third light sources. If the third light source 330 exists only, flicker is not generated by the image sensor. However, if flicker is generated, it is not easy to identify whether a factor of the flicker is caused by the first light source 310 or the second light source 320.

However, an infrared signal based on the infrared sensor 143 has high reflectivity with respect to the first light source 310 and the third light source 330 but has low reflectivity with respect to the second light source 320. That is, if the infrared sensor 143 is provided, white balance based on the types of the light sources may be performed.

Therefore, if flicker is generated by the image sensor and the infrared signal is detected, it may be determined that the flicker is caused by the first light source 310. Also, if flicker is generated by the image sensor and the infrared signal is not detected, it may be determined that the flicker is caused by the second light source 320. Also, if flicker is not generated by the image sensor, it may be determined that the third light source 330 only exists as a peripheral light source.

Also, the mobile terminal and the image processing method according to the present invention will be described with reference to FIGS. 5 to 9. In this case, a case where the infrared sensor 143 is first driven as well as a case where the image sensor is first driven and then the infrared sensor 143 is driven may be considered.

Figure 5:
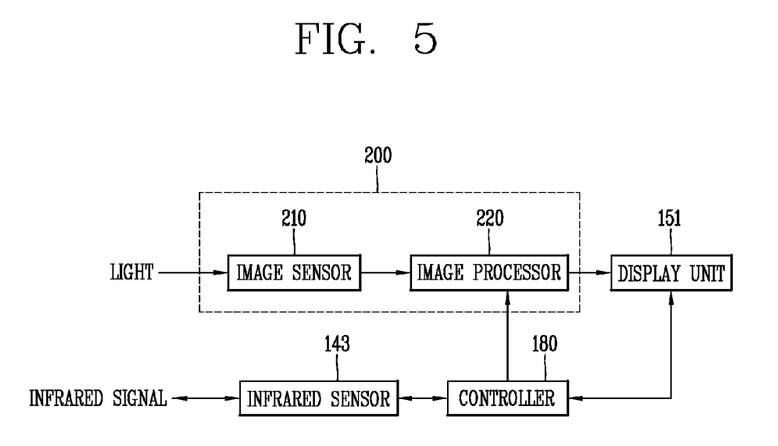
FIG. 5 is a block diagram illustrating a mobile terminal that includes a camera, which performs white balance, an infrared sensor, and a display unit in accordance with the present invention.

FIG. 5 is a block diagram illustrating a mobile terminal that performs white balance in accordance with the present invention. As shown in FIG. 5, the camera 200 is provided in the mobile terminal 100. In this case, the camera 200 may include an image sensor 210 and an image processor 220. Also, the mobile terminal may further include an infrared sensor 143, a display unit 151, and a controller 180.

The infrared sensor 143 detects an infrared signal reflected from an object taken through the camera 200.

The display unit 151 displays the taken object and an image associated with a peripheral background on a screen.

The controller 180 determines whether flicker is generated using the image sensor 210, and detects information related to a light source contributed to generation of the flicker using an infrared signal. At this time, if flicker is not generated, it is determined that the third light source (solar light) only exists. Meanwhile, if flicker is generated, the infrared signal may be used to determine whether the flicker is caused by any one of the first light source and the second light source.

Also, the controller 180 may determine whether flicker is generated using the infrared sensor 143 and detect information related to the light source contributed to generation of the flicker using an image sensor signal.

At this time, the controller 180 determines whether the infrared signal acquired from the infrared sensor 143 is a predetermined value or more. Also, if the infrared signal acquired from the infrared sensor 143 is a predetermined value or more, the controller 180 determines whether flicker is generated, on the basis of variation of average intensity of the infrared signal. Also, if flicker is generated, the controller 180 generates flicker information and information related to the light source contributing to generation of the flicker. In this case, the flicker information means time variable flicker values or variation of these flicker values.

The image sensor 210 acquires an image signal of an object taken through the camera 200 in an environment that at least one light source exists.

The image processor 220 performs white balance of the acquired image on the basis of flicker information of the image signal acquired from the image sensor and information related to the light source.

In this case, if the peripheral light source is an incandescent lamp (the first light source), a color temperature spectrum is shifted to a red color, and if the peripheral light source is a fluorescent lamp (the second light source), the color temperature spectrum is shifted to a green color. Therefore, white balance is a scheme for correcting a color to allow a unique color of an object to be displayed on the display unit 151 regardless of the type of the light source by electrically correcting spectrum shift based on the light source.

Also, flicker means variation in quantity of light from the light source according to variation of time. In more detail, flicker is generated as average intensity of the light source is varied for a specific time.

Figure 6:
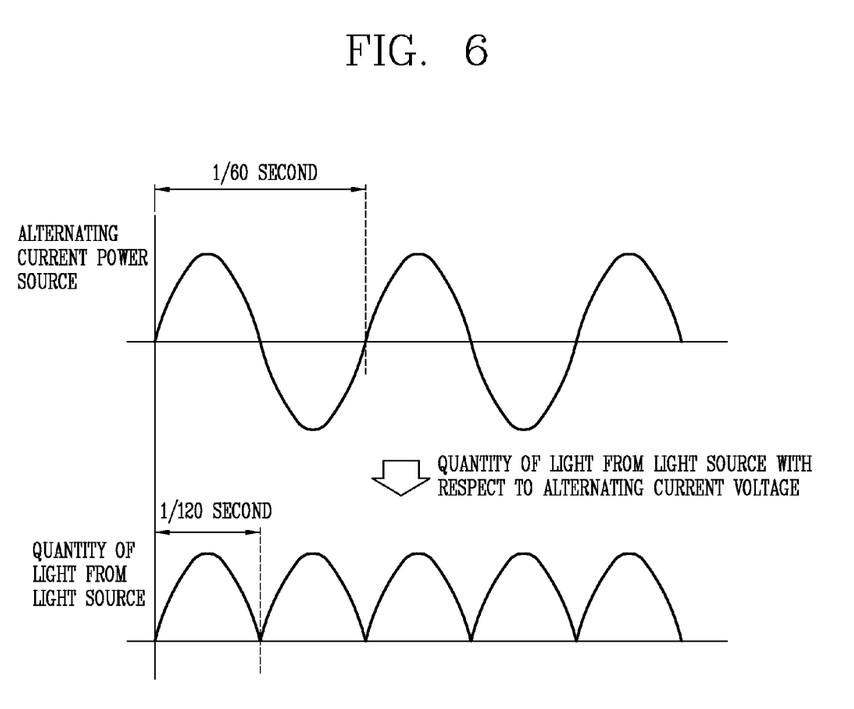
FIG. 6 illustrates variation in quantity of light of a light source based on a supply power source.
Figure 7:
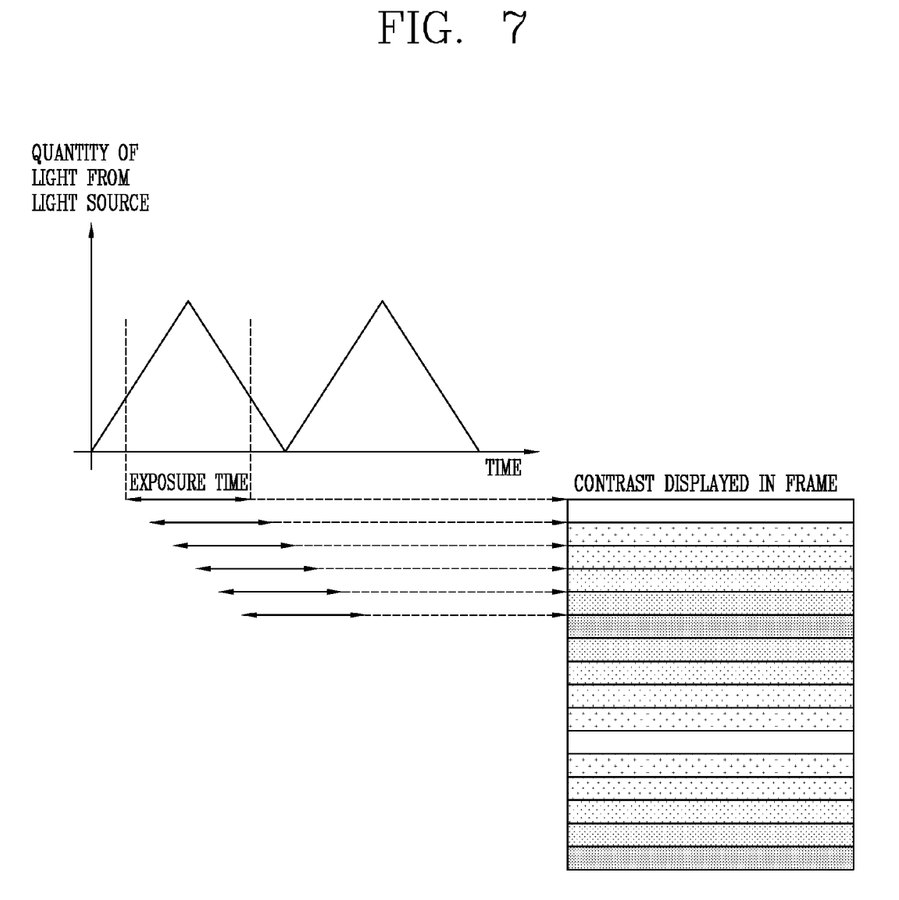
FIG. 7 illustrates variation in quantity of light of a light source based on variation of time.

Meanwhile, FIG. 6 illustrates variation in quantity of light of a light source based on a supply power source, and FIG. 7 illustrates variation in quantity of light of a light source based on variation of time.

As shown in FIG. 6, a power source of 50 Hz or 60 Hz is supplied to an incandescent lamp and a fluorescent lamp. In this case, it is noted that the quantity of light of the light source such as the incandescent lamp and the fluorescent lamp is varied depending on time at a period of $\frac{1}{120}$ second if the frequency of the supply power source is 60 Hz. On the other hand, natural light such as solar light is not varied depending on time but has a given quantity of light.

Therefore, natural light incident on the camera 200 can be identified from the incandescent lamp and the fluorescent lamp. However, it is not easy to identify whether the incandescent lamp or the fluorescent lamp has entered the camera 200 as the peripheral light. However, as described above, if the infrared signal reflected from the object is detected, it is possible to identify whether the incandescent lamp or the fluorescent lamp has entered the camera 200 as the peripheral light.

Meanwhile, the method for detecting information related to the peripheral light source will be described in more detail.

If a case where an object having high reflectivity toward the infrared signal is taken from solar light (the third light source) is compared with a case where the object is taken from the incandescent lamp (the first light source), sizes of signals reflected from the object may be similar to each other.

However, if the object is taken from the fluorescent lamp (the second light source), a size of a signal reflected from the object is smaller than those of signals reflected from the objects taken from the first and third light sources. Therefore, if the infrared signal is a predetermined value or less, the controller 180 generates information related to the light source as the fluorescent lamp (the second light source) and transmits the information related to the light source to the image processor 220. In this case, the image processor 220 performs white balance of the acquired image on the basis of the second light source.

Also, if it is determined that the infrared signal is a predetermined value or more and flicker is generated, the controller 180 determines that the incandescent lamp (the first light source) exists. Meanwhile, if it is determined that the infrared signal is a predetermined value or more and flicker is not generated, the controller 180 determines that the solar light (the third light source) exists. In this case, the image processor 220 performs white balance of the acquired image on the basis of the first light source and the third light source.

However, determination of the information related to the light source and the performance of white balance are not limited to the case where it is determined that one type of light source exists and white balance is performed based on the determined result. For example, if the peripheral light source includes the incandescent lamp (the first light source) of 70% and the solar light (the second light source) of 30%, the peripheral light source has a flicker pattern different from that corresponding to a case where the peripheral light source includes the incandescent lamp (the first light source) of 100%.

Therefore, the controller 180 may determine a detailed rate of information related to the light source on the basis of the flicker information and transmit the determined rate to the image processor 220. Also, the controller 180 may transmit the flicker information to the image processor 220, and the image processor 220 may determine a detailed rate of the information related to the light source.

As shown in FIG. 7, the quantity of light of the light source acquired from the infrared sensor 143 and the image sensor 210 is varied depending on time. If the light source is solar light, the quantity of light will be fixed regardless of variation of time.

Meanwhile, if a starting timing point of exposure time of the infrared sensor 143 and the image sensor 210 is varied for the quantity of light varied depending on time, it is noted that an average intensity value of the quantity of light is varied per time period. Referring to FIG. 6, it is noted that the average intensity value of the quantity of light is reduced as a start time is increased, whereby the contrast displayed on each time frame is displayed to be dark.

If the image sensor 210 is a complementary metal-oxide semiconductor (CMOS) image sensor, the image sensor is implemented in a type of a rolling shutter. Therefore, the image sensor 210 has exposure timing varied per line within a frame. That is, the total quantity of light based on the exposure time is varied per line of the image sensor, whereby flicker is generated.

Meanwhile, whether flicker is generated is sensed, whereby it is noted that flicker is caused by the incandescent lamp (the first light source) with respect to the infrared sensor 143. Also, it is noted that flicker is caused by the incandescent lamp (the first light source) or the fluorescent lamp (the second light source) with respect to the image sensor 143.

Meanwhile, according to one embodiment of the present invention, each of the image signal and the infrared signals includes a plurality of input signals of which start timing points are different from one another.

Also, the frequency of exposure time of the plurality of input signals is different from the operation frequency of the first and second light sources. This is because that average intensity of the light source is not varied for the exposure time even though the exposure time is varied if the frequency of the exposure time is the same as the operation frequency of 50 Hz (or 60 Hz) of the first and second light sources.

Hereinafter, a more detailed procedure of determining information related to the light source and performing white balance in the controller 180 or the image processor 220 will be described.

The image processor 220 may perform white balance of the acquired image on the basis of the fluorescent lamp (the second light source). This is because that the fluorescent lamp (the second light source) is a main light source in case of the indoor photographing. Also, if the infrared sensor 143 is not always on state and thus is disabled, the time may be required until the infrared sensor 143 is enabled. Therefore, white balance of the image acquired on the basis of the fluorescent lamp (second light source) may be performed in a default state.

Next, if the infrared signal is a predetermined value or more and flicker is generated, the image processor 220 performs white balance of the acquired image on the basis of the first light source. On the other hand, if the infrared signal is a predetermined value or more and flicker is not generated, the image processor 220 performs white balance of the acquired image on the basis of the third light source.

The controller 180 may determine whether the infrared sensor is enabled, and may determine whether flicker is generated, on the basis of variation of average intensity of the image signal if the infrared sensor is disabled.

At this time, if flicker is not generated, the image processor 220 may perform white balance of the acquired image on the basis of the third light source. Also, if flicker is generated, the controller 180 may again determine whether the infrared sensor is enabled.

The image processor 220 may perform white balance, auto exposure and auto focus for the acquired image. Also, the image processor 220 may digitalize and analyze the image processed by white balance, auto exposure and auto focus.

Meanwhile, the image processor 220 may be implemented by a hardware circuit and firmware or software built in the camera 200. Also, the image processor 220 may be implemented by a hardware circuit and firmware or software within the controller 180 unlike FIG. 5.

Hereinafter, the image processing method of a mobile terminal provided with a camera according to the present invention will be described. White balance according to a plurality of light sources may be performed by the image processing method.

Figure 8:
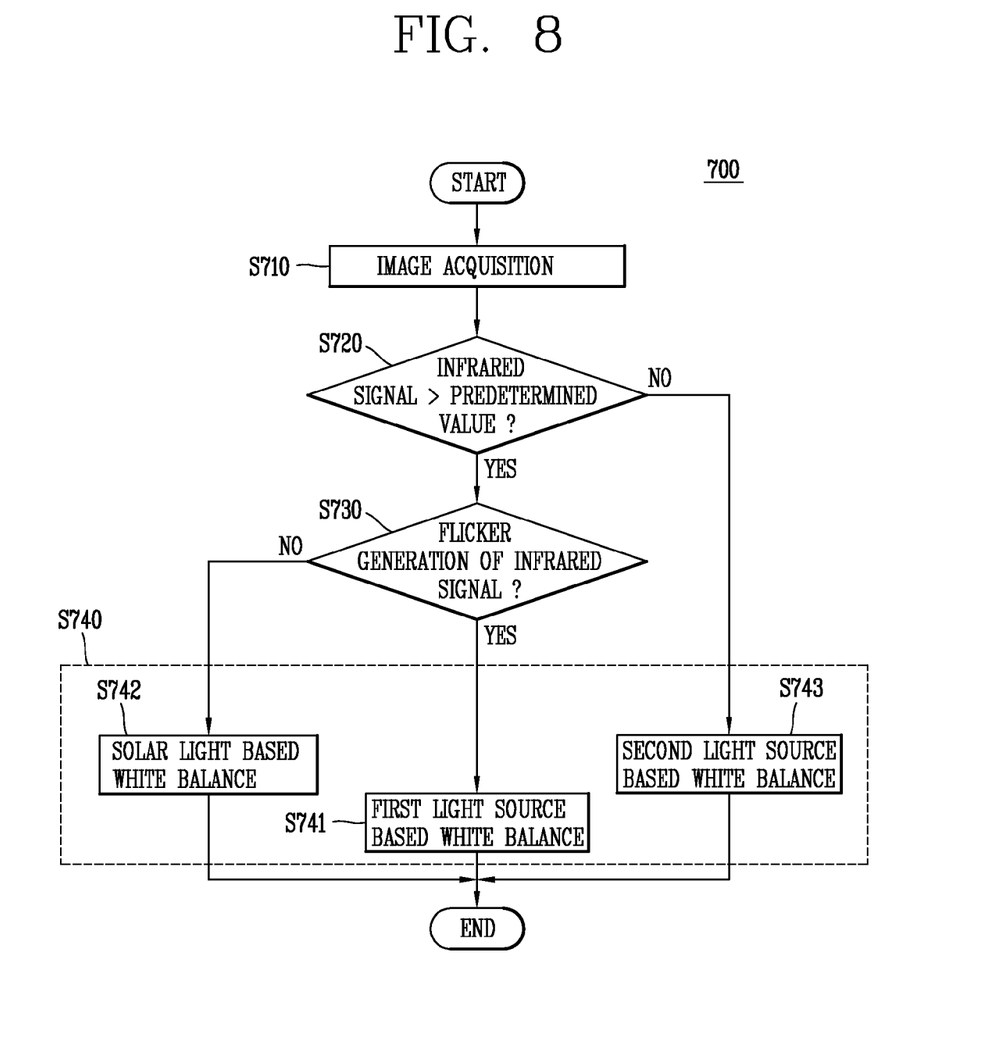
FIG. 8 is a flow chart illustrating an image processing method according to one embodiment of the present invention.

FIG. 8 is a flow chart illustrating an image processing method according to one embodiment of the present invention. The method of FIG. 8 is a method for performing white balance if an infrared sensor may detect an infrared signal reflected from an object.

Figure 9:
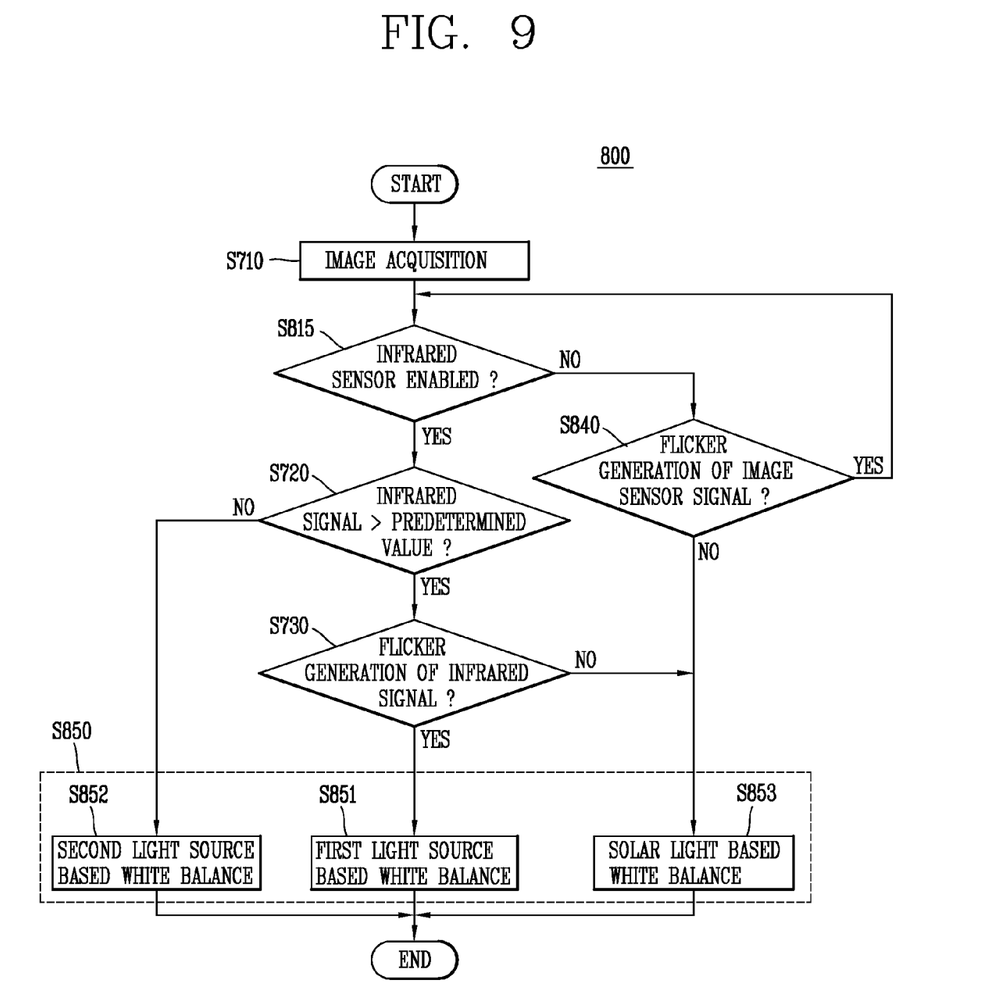
FIG. 9 is a flow chart illustrating an image processing method according to another embodiment of the present invention.

FIG. 9 is a flow chart illustrating an image processing method according to another embodiment of the present invention. The method of FIG. 9 is a method for performing optimized white balance by determining whether an infrared sensor is enabled.

Referring to FIG. 8, the image processing method (700) includes the step S710 of acquiring an image, the step S720 of comparing an infrared signal, the step S730 of determining whether flicker is generated, and the step S740 of performing white balance. In this case, the step S740 of performing white balance includes steps S741 to S743 of performing first to third white balances.

The step S710 of acquiring an image includes acquiring an image of an object taken through the camera in an environment that at least one light source exists.

The step S720 of comparing an infrared signal includes detecting the infrared signal reflected from the object through the infrared sensor and determining whether the detected infrared signal is a predetermined value or more.

The step S730 of determining whether flicker is generated includes determining whether flicker is generated on the basis of variation of average intensity of the infrared signal if the infrared signal is a predetermined value or more.

The step S741 of performing first white balance includes performing white balance of the acquired image on the basis of flicker information and a light source (incandescent lamp, the first light source) contributing to generation of the flicker if flicker is generated.

The step S742 of performing second white balance includes performing white balance of the acquired image on the basis of the third light source (solar light) if flicker is not generated.

The step S743 of performing third white balance includes performing white balance of the acquired image on the basis of the second light source (fluorescent lamp) if the infrared signal is a predetermined value or less.

In this case, each of the image signal and the infrared signals includes a plurality of input signals, of which starting points are different from one another. Also, a frequency of an exposure time of the plurality of input signals is different from operation frequencies of the first and second light sources. This is because that there is no variation in quantity of light based on variation of time if the frequency of the exposure is the same as the operation frequencies. This has been described with reference to FIG. 6.

Next, referring to FIG. 9, the image processing method 800 includes the step S710 of acquiring an image, the step S815 of determining whether the infrared sensor is enabled, the step S720 of comparing an infrared signal, the step S730 of determining whether first flicker is generated, the step S840 of determining whether second flicker is generated, and the step S850 of performing white balance. In this case, the step S850 of performing white balance includes steps S851 to S853 of performing first to third white balances.

In this case, the step S710 of acquiring an image and the step S720 of comparing an infrared signal will be replaced with the description of FIG. 7. Also, the step S730 of determining whether first flicker is generated corresponds to the step S730 of determining whether a flicker is generated in FIG. 7.

In the step S815, it is determined whether the infrared sensor is enabled. This is because that the image sensor is enabled if the camera is enabled but the infrared sensor is operated separately from the camera. Also, even though the infrared sensor is enabled as the camera is enabled, the infrared sensor may already be used by another application.

The step S840 determines whether second flicker is generated on the basis of variation of average intensity of the image signal if the infrared sensor is disabled.

Meanwhile, the steps S851 to S853 of performing first to third white balances include performing white balance of the image acquired from the image sensor on the basis of the first light source (incandescent lamp), the second light source (fluorescent lamp) and the third light source (solar light).

Meanwhile, if flicker is not generated in the step S840 of determining whether second flicker is generated, white balance of the acquired image is performed on the basis of the third light source (S853).

On the other hand, if flicker is generated in the step S840 of determining whether second flicker is generated, it is determined again whether the infrared sensor is enabled (S815). This is to determine whether the flicker relates to either the first light source (incandescent lamp) or the second light source (fluorescent lamp).

However, if flicker is generated in the step S840 of determining whether second flicker is generated, it is not determined again whether infrared sensor is enabled, or after a certain time passes, white balance of the acquired image may be performed on the basis of the second light source (fluorescent lamp). Also, if the image sensor is disabled in the step S815 of determining whether the infrared sensor is enabled, white balance may be performed on the basis of the second light source in a default state.

Also, flicker patterns from the image sensor may be compared with each other to determine whether the flicker patterns are caused by the first light source (incandescent lamp) or the second light source (fluorescent lamp). However, since the flicker patterns caused by the first light source (incandescent lamp) or the second light source (fluorescent lamp) are similar to each other, it is not preferable that it is determined whether the flicker patterns are caused by the first light source or the second light source.

Meanwhile, if the infrared sensor is enabled while or after white balance of the acquired image is performed on the basis of the second light source, the step S720 of comparing the infrared signal may be performed if the infrared sensor is enabled.

Therefore, if the infrared signal is a predetermined value or more in the step S720 of comparing the infrared signal, and if flicker is generated in the step S730 of determining whether first flicker is generated, white balance of the acquired image is performed on the basis of the first light source (incandescent lamp) (S851).

Also, if the infrared signal is a predetermined value or more in the step S720 of comparing the infrared signal, and if the flicker is not generated in the step S730 of determining whether the first flicker is generated, white balance of the acquired image is performed on the basis of the third light source (solar light) (S853).

Also, if the infrared signal is a predetermined value or less in the step S720 of comparing the infrared signal, white balance of the acquired image is performed on the basis of the second light source (incandescent lamp) (S852).

As described above, in the mobile terminal equipped with a camera according to the present invention, the image processing method for performing white balance has been described in detail.

According to the image processing method and the method for white balance, if at least one peripheral light source exists, effective white balance according to the type of the light source may be performed. Also, even though a plurality of peripheral light sources exist, a ratio of the plurality of peripheral light sources may be predicted, whereby white balance according to the ratio of the plurality of light sources may be performed.

According to at least one of the embodiments of the present invention, it is advantageous in that effective white balancing according to the type of the peripheral light sources may be performed through flicker analysis based on the image sensor and the infrared sensor.

Also, according to at least one of the embodiments of the present invention, it is advantageous in that effective white balancing according to the type of the peripheral light sources may be performed even in the case that the infrared sensor is enabled.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal configured to process images, the mobile terminal comprising:
    a camera configured to capture the images;
    an image sensor configured to acquire an image signal of an object in an image captured via the camera;
    an infrared sensor configured to detect an infrared signal reflected from the object;
    a controller configured to:
    determine whether flicker is generated;
    detect information related to a light source contributing to the generated flicker based on the detected infrared signal if flicker is generated; and
    an image processor configured to perform white balance of the acquired image signal, the white balance performed based on the detected information if flicker is generated,
    wherein an order of detecting the infrared signal and the flicker is determined based on whether the infrared sensor is activated;
    wherein either the image sensor or the infrared sensor is selected to detect the flicker based on whether the infrared sensor is activated,
    wherein the infrared signal is detected and then the flicker is detected using the activated infrared sensor when the infrared sensor is activated, and
    wherein the flicker is detected using the image sensor and then the infrared sensor is activated and used to detect the infrared signal when the infrared sensor is not activated.

2. The mobile terminal according to claim 1, wherein:
    the light source includes a first light source that is incandescent light and a second light source that is fluorescent light; and
    the white balance is performed based on the second light source if the detected infrared signal is less than or equal to a predetermined value.

3. The mobile terminal according to claim 2, wherein:
    the light source further includes a third light source that is solar light; and
    the white balance is performed based on the third light source if the detected infrared signal is greater than the predetermined value and flicker is not generated.

4. The mobile terminal according to claim 3, wherein:
    the image signal and the infrared signal each includes a plurality of input signals each having a different starting point; and
    a frequency of an exposure time of each of the plurality of input signals is different from operation frequencies of the first and second light sources.

5. The mobile terminal according to claim 3, wherein:
    the white balance is performed based on the first light source if the detected infrared signal is greater than the predetermined value and flicker is generated.

6. The mobile terminal according to claim 3, wherein:
    the white balance is performed based on the third light source if the infrared sensor is not activated and flicker is not generated; and
    the controller is further configured to re-determine whether the infrared sensor is activated if flicker is generated.

7. The mobile terminal of claim 3, wherein the controller is further configured to determine whether flicker is generated based on variation of average intensity of the acquired image signal.

8. The mobile terminal of claim 1, wherein the controller is further configured to determine whether flicker is generated based on variation of average intensity of the acquired image signal.

9. The mobile terminal according to claim 1, wherein the image processor is further configured to:
    perform auto exposure and auto focus of the acquired image signal; and
    digitalize and analyze the acquired image signal processed by white balance, auto exposure and auto focus.

10. A method of processing images in a mobile terminal comprising a camera, the method comprising:
    acquiring an image signal of an object in an image captured via the camera;
    detecting an infrared signal reflected from the object;
    determining whether flicker is generated;
    detecting information related to a light source contributing to the generated flicker based on the detected infrared signal if flicker is generated; and
    performing white balance of the acquired image signal, the white balance performed based on the detected information if flicker is generated,
    wherein an order of detecting the infrared signal and the flicker is determined based on whether an infrared sensor is activated;
    wherein either an image sensor or an infrared sensor is selected to detect the flicker based on whether the infrared sensor is activated,
    wherein the infrared signal is detected and then the flicker is detected using the activated infrared sensor when the infrared sensor is activated, and
    wherein the flicker is detected using the image sensor and then the infrared sensor is activated and used to detect the infrared signal when the infrared sensor is not activated.

11. The image processing method according to claim 10, wherein:
    the light source includes a first light source that is incandescent light and a second light source that is fluorescent light; and
    the white balance is performed based on the second light source if the detected infrared signal is less than or equal to a predetermined value.

12. The image processing method according to claim 11, wherein:

the light source further includes a third light source that is solar light; and the white balance is performed based on the third light source if the detected infrared signal is greater than the predetermined value and flicker is not generated.

13. The image processing method according to claim 12, wherein:

the image signal and the infrared signal each includes a plurality of input signals each having a different starting point; and a frequency of an exposure time of the plurality of input signals is different from operation frequencies of the first and second light sources frequencies of the first and second light sources.

14. The image processing method according to claim 12, wherein:

the white balance is performed based on the first light source if the detected infrared signal is greater than the predetermined value and flicker is generated.

15. The image processing method according to claim 12, further comprising:

performing white balance based on the third light source if the infrared sensor is not activated and flicker is not generated; and re-determining whether the infrared sensor is activated if flicker is generated.

16. The method of claim 10, wherein determining whether flicker is generated comprises determining a variation of average intensity of the acquired image signal.

17. The method of claim 10, wherein determining whether flicker is generated comprises determining a variation of average intensity of the acquired image signal.

18. The image processing method according to claim 10, further comprising:

performing auto exposure and auto focus of the acquired image signal; and digitalizing and analyzing the acquired image signal processed by white balance, auto exposure and auto focus.

* * * * *